United States Patent
Dunn et al.

(10) Patent No.: US 8,699,124 B2
(45) Date of Patent: Apr. 15, 2014

(54) PARAMETRIC GENERATOR

(75) Inventors: Malcolm Harry Dunn, Fife (GB); Cameron Francis Rae, Fife (GB); David James Mark Stothard, Fife (GB); David Alan Walsh, Fife (GB)

(73) Assignee: University Court of The University of St Andrews, St Andrews (GB)

( * ) Notice: Subject to any disclaimer, the term of this patent is extended or adjusted under 35 U.S.C. 154(b) by 0 days.

(21) Appl. No.: 13/643,280

(22) PCT Filed: Jun. 16, 2011

(86) PCT No.: PCT/GB2011/000899
§ 371 (c)(1), (2), (4) Date: Feb. 18, 2013

(87) PCT Pub. No.: WO2011/157990
PCT Pub. Date: Dec. 22, 2011

(65) Prior Publication Data
US 2013/0163070 A1    Jun. 27, 2013

(30) Foreign Application Priority Data
Jun. 16, 2010  (GB) .................................. 1010023.8

(51) Int. Cl.
*G02F 1/39*    (2006.01)
(52) U.S. Cl.
USPC .......................................... 359/330; 359/326
(58) Field of Classification Search
CPC ...................................................... G02F 1/39
USPC ................ 359/326–332; 372/21–22
See application file for complete search history.

(56) References Cited

U.S. PATENT DOCUMENTS

| | | | |
|---|---|---|---|
| 5,457,707 A | 10/1995 | Sobey et al. | |
| 6,697,186 B2 * | 2/2004 | Kawase et al. | 359/330 |
| 6,882,465 B1 * | 4/2005 | Boulanger et al. | 359/326 |
| 7,706,054 B2 * | 4/2010 | Rae et al. | 359/330 |
| 7,881,349 B2 * | 2/2011 | Ihli et al. | 372/22 |
| 7,995,628 B2 * | 8/2011 | Wu | 372/21 |
| 2007/0177260 A1 | 8/2007 | Kuppenheimer et al. | |

FOREIGN PATENT DOCUMENTS

| | | |
|---|---|---|
| EP | 1821141 A1 | 8/2007 |
| WO | WO00/72411 A1 | 11/2000 |
| WO | WO2006/072183 A2 | 7/2006 |
| WO | WO2007/107441 A1 | 9/2007 |

OTHER PUBLICATIONS

Kawase et al: "Terahertz wave parameter source"; Journal of Physics D: Applied Physics, vol. 35, PT 3, 2002, pp. R1-R14.

(Continued)

*Primary Examiner* — Daniel Petkovsek
(74) *Attorney, Agent, or Firm* — Moore & Van Allen PLLC; W. Kevin Ransom

(57) ABSTRACT

A method of optimizing parametric gain in a nonlinear optical crystal that in response to application of a pump beam generates through a parametric generation process signal and idler beams, wherein the signal beam is non-collinear with the pump beam and the signal beam is subject to absorption due to the nonlinear material, the method involving shaping the pump beam to have an elliptical cross section, wherein the method further involves determining the width w of the pump beam depending on the absorption co-efficient of the optical crystal.

9 Claims, 3 Drawing Sheets

(56) References Cited

OTHER PUBLICATIONS

Sato et al.: "Development of a compact THz-wave parametric generator system including a pump source"; The 4$^{th}$ Pacific Rim Conference on Lasers and Electro-Optics 2001; IEEE Service Center, vol. 2, Jul. 15, 2001, pp. II-158-II-159.

Edwards et al.: "Compact source of continuously and widely-tunable terahertz radiation"; Optics Express, vol. 14, No. 4, Feb. 20, 2006, pp. 1582-1589.

Russell et al.: "Broadband mid-infrared generation in elliptically pumped periodically poled lithium niobate devices"; Conference on Lasers and Electro-Optics 2001; Technical Digest, vol. 56, May 6, 2001, pp. 425-426.

Yarborough et al.: "Efficient, Tunable Optical Emission From LiNbO3 Without a Resonator"; Applied Physics Letters, vol. 15, No. 3, Aug. 1, 1969, pp. 102-105.

International Search Report for PCT/GB2011/000899, dated Sep. 14, 2011.

UK Search Report for GB0812008.1, dated Oct. 9, 2008.

* cited by examiner (a)

(b)

(a)

(b)

PARAMETRIC GENERATOR

This invention relates to the generation of electro-magnetic radiation through a parametric-wave generation process in a non-linear material, and in particular a method of optimizing the generation efficiency and the useful extraction of said radiation when it is subject to absorption in the nonlinear material.

BACKGROUND OF THE INVENTION

Parametric devices are flexible and convenient sources of widely tunable coherent radiation. In these, a coherent beam of electromagnetic radiation is applied to a nonlinear optical crystal so as to stimulate a nonlinear optical process resulting in the division of the power/energy in this coherent pump wave into two generated waves, typically referred to as the signal and idler waves. The signal is usually defined as that wave providing the useful output, and as such throughout this document is identified as the wave having the longer wavelength of the two generated waves.

There is considerable interest in extending the spectral coverage of parametric devices. This is because they are often used as sources of coherent radiation in spectral ranges either not covered by any other source types, or where a single parametric-wave source is capable of replacing a number of sources that would otherwise be needed in order to provide the spectral coverage required. However, a limitation of known parametric devices is the detrimental effect of absorption of one or more of the three waves involved in the non-linear interaction within the nonlinear medium itself. As a result the spectral coverage attainable through a particular parametric generation scheme is often limited only by the presence of absorption and not by the nonlinear or phase-matching characteristics of the nonlinear medium being employed. Mitigation of the restriction imposed by absorption results in improved spectral coverage being attained by parametric-wave devices.

A class of device in which the spectral coverage of parametric generators has been extended is the terahertz (THz) optical parametric generator (OPG), where the useful output (the signal wave) is a beam of wavelength consistent with THz frequencies. Often in such devices absorption of the signal wave is prevalent as the nonlinear medium can be highly absorbing at THz frequencies. A particular example of this type of device includes a non-collinear phase-matching scheme in which the signal wave is made to rapidly walk-out of the nonlinear medium in a direction that is substantially lateral to the propagation direction of the pump wave, hence minimizing the deleterious effects of absorption on the signal wave. Examples of this technique are described in the articles "Efficient, tunable optical emission from LiNbO$_3$ without a resonator", by Yarborough et al, Applied Physics Letters 15(3), pages 102-104 (1969), "Terahertz wave parametric source", by Kawase et al, Journal of Physics D: Applied Physics 35(3), pages R1-14 (2002) and "Compact source of continuously and widely-tunable terahertz radiation", by Dunn et al, Opt. Exp. 14 (4), p. 1582, (2006).

FIG. 1 is an illustration of this known non-collinear phase-matching process. More specifically, FIG. 1(a) illustrates the geometry of the interacting pump 1, idler 2 and signal 3 waves in the nonlinear medium 4. FIG. 1(b) illustrates the phase-matching process through a so-called k-vector diagram, where $k_p$, $k_i$ and $k_s$ are the wavevectors of the pump, idler and signal waves respectively, angle $\theta$ is the angle subtended by the pump and idler waves and angle $\phi$ the angle subtended by the pump and signal waves.

As can be seen from FIG. 1(a), in the known non-collinear phase matching process the pump wave 1, the idler wave 2 and the signal wave 3 are non-collinear within the nonlinear medium 4. Thus, to maintain the desired nonlinear interaction between the pump and idler waves throughout the length of the nonlinear medium 4, they must be of sufficient radial (transverse) extent to maintain a spatial overlap between them throughout the length of the medium 4. Furthermore, to maintain the nonlinear interaction between the pump and the signal waves over a length to achieve the necessary parametric gain for the device to work the radial extent of the interacting beams has to be sufficiently large. However, this is contrary to the radial extent of the interacting beams being small for the purpose of increasing the intensities of the beams, so as to reduce the pump power or energy necessary for attaining a level of parametric gain required for the operation of the device.

Another example of the THz OPG class of device is the hybrid collinear/non-collinear phase matched OPG based on slant-stripe periodically poled nonlinear materials, where again the signal wave propagates substantially laterally (and can be orthogonal) to the pump beam direction, see EP1771765, the contents of which are incorporated herein by reference. FIG. 2 shows an example of this known hybrid phase matching process. More specifically, FIG. 2(a) illustrates the geometry of the interacting pump 1, idler 2 and signal 3 waves in the nonlinear medium 4. FIG. 2(b) illustrates the phase-matching process through a k-vector diagram, where $k_p$, $k_i$ and $k_s$ are the wave vectors of the pump, idler and signal waves respectively, angle $\alpha$ is the angle subtended by the pump and periodic poling grating normal and angle $\phi$ the angle subtended by the pump and signal waves.

As can be seen from FIG. 2(a), in the hybrid collinear/non-collinear phase matching process the pump wave 1 and idler wave 2 are themselves collinear within the nonlinear medium 4. However, the signal wave 3 rapidly walks away from both the pump wave 1 and idler wave 2 and rapidly exits the nonlinear medium 4 to avoid excessive absorption loss. Again, there exist the contrary requirements of small radial extent to the interacting beams to minimize the effects of absorption on the signal wave and achieve the pump intensity necessary to achieve a parametric gain sufficient to make the device operate and large radial extent to maximize the interaction length.

In the case generally of parametric generators of non-collinear phase-matched type, and collinear phase-matched type where there can be present a form of walk-off between the interacting waves commonly termed double refraction, these contradictory requirements on the spatial extent of the interacting beams can be addressed by the use of elliptical beam shaping using cylindrical beam shaping optics. In such devices, the cylindrical optics shape the transverse spatial extent of the interacting beams so that the extent of the beams in the non-walk-off plane is made small while the extent of the beams in the walk-off plane is made sufficiently large to maintain spatial overlap between the beams over the length of the nonlinear crystal, but at the same time the overall area of the beams is made desirably small. Thus, the pump intensity can be desirably high.

Optimizing the spatial extent of the interacting beams to maximize the usefully output coupled power/energy in the preferred signal or idler beam is, in the prior art, applicable to systems where absorption is not significant and dependent only upon the desired operating pump beam intensity and degree of non-collinearity. However, this is not directly applicable where one of the beams, normally that associated with the large walk-off direction, is subject to absorption in the nonlinear medium.

SUMMARY OF THE INVENTION

According to one aspect of the present invention, there is provided a method of optimizing parametric gain in a nonlinear optical crystal that in response to application of a pump beam generates through a parametric generation process signal and idler beams, wherein the signal beam is non-collinear with the pump beam and the signal beam is subject to absorption due to the nonlinear material, the method involving shaping the pump beam to have an elliptical cross section, wherein the method further involves determining the width w of the pump beam depending on an absorption co-efficient of the optical crystal.

Preferably, the pump beam width is selected so that the product of the absorption co-efficient of the optical crystal and the beam width provides for maximum extraction of the generated signal beam power from the optical crystal, this being determined by a compromise between the nonlinear gain and optical crystal absorption. By using elliptical beam shaping, the usefully output coupled power/energy in the signal beam is improved when generated in the presence of absorption of the signal beam in the nonlinear crystal.

The width w of the pump beam may be in the range $0.5/\beta$ and $2.5/\beta$. The width w of the pump beam may be selected to be between $1/\beta$ and $2/\beta$. The width w of the pump beam may be selected to be substantially $1/\beta$ or substantially $2/\beta$.

According to another aspect of the invention, there is provided a device comprising: a nonlinear optical crystal which, in response to the application of a pump beam, generates through a parametric generation process signal and idler beams, and means for shaping the pump to have an elliptical cross section, wherein the width w of the pump beam is selected so that the product of the absorption co-efficient of the optical crystal and the beam width provides for maximum extraction of the generated signal beam power from the optical crystal, this being determined by the compromise between the nonlinear gain and optical crystal absorption.

BRIEF DESCRIPTION OF THE DRAWINGS

Various aspects of the invention will now be described by way of example only and with reference the following drawings, of which.

DETAILED DESCRIPTION OF THE INVENTION

Figure 3:
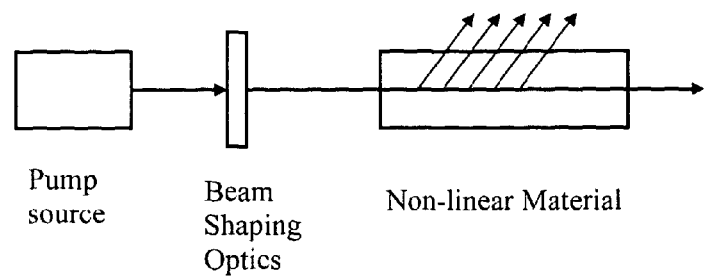
FIG. 3 is schematic diagram of a parametric generator in which the pump is elliptically shaped to optimize parametric gain.

FIG. 3 shows a parametric generator that has a non-linear material and uses a parametric generation process to generate signal and idler waves from an applied pump wave. In this case, the pump and idler waves are collinear and the signal walks off and is subject to absorption due to the non-linear material. To optimize parametric gain in these circumstances, the pump is elliptically shaped by an amount dependent on the absorption co-efficient of the non-linear material. By designing the pump beam shape in this way, output performance can be improved. Optimizing the spatial form of the beams also can be used to minimize the pump power required to achieve the necessary parametric gain. This is a significant technical advance.

Figure 1:
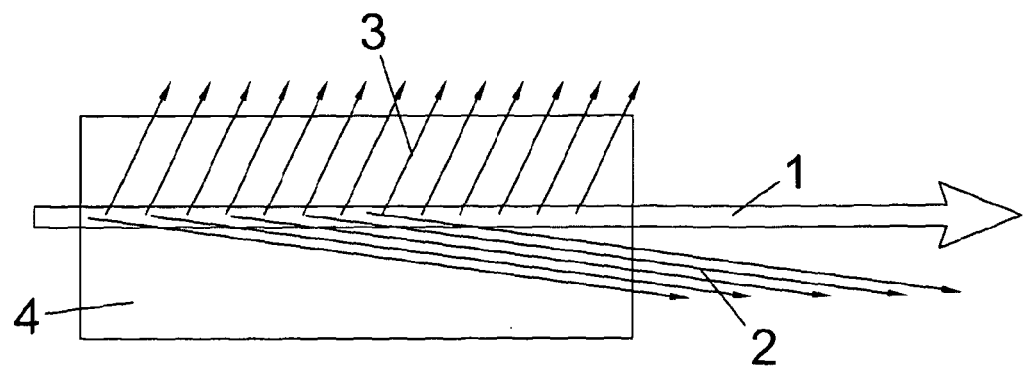
FIG. 1 is a schematic representation of (a) a non-collinear beam propagation geometry within a nonlinear optical crystal, and (b) non-collinear phasematching of the interacting beams.
Figure 1:
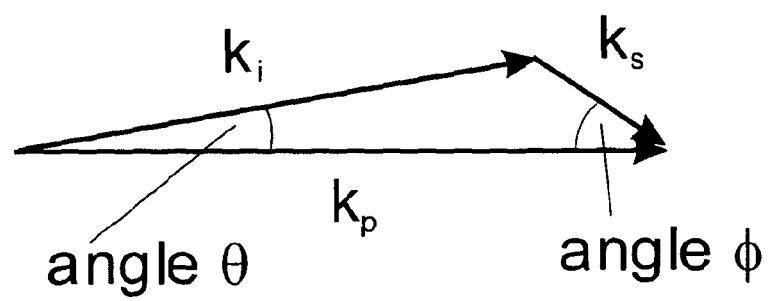
Figure 2:
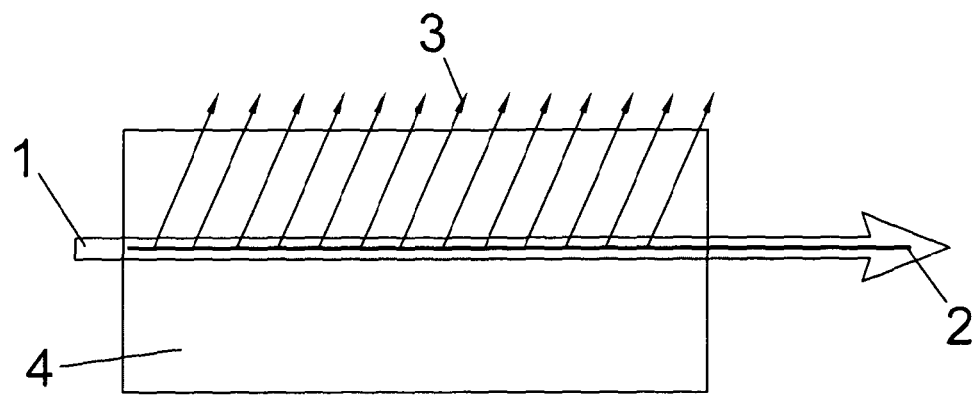
FIG. 2 is a schematical representation of (a) a hybrid collinear/non-collinear beam propagation geometry within the nonlinear optical crystal, and (b) a hybrid collinear/non-collinear phasematching of the interacting beams.
Figure 2:
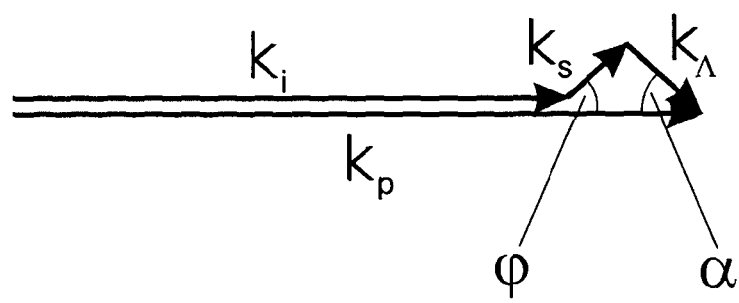

To demonstrate the effectiveness of elliptical beam shaping, so as to optimize an optical parametric generator (OPG) device output in the presence of absorption of one of the parametrically generated waves, a brief mathematical description of the device shown in FIG. 2(*a*) is usefully employed.

For the geometry illustrated in FIG. 2(*a*), it is assumed the pump wave 1 and idler wave 2 are infinite plane waves propagating along the x-axis of the nonlinear medium 4, while the signal (THz) wave 3 is a plane wave propagating along the y-axis of the nonlinear medium 4. For the case shown in FIG. 2(*b*), i.e. where the nonlinear interaction is appropriately phase-matched through so-called quasi-phase-matching, the coupled-wave equations that describe the evolution and depletion of the signal ($E_s$), idler ($E_i$) and pump ($E_p$) fields are valid and the evolution of the signal field amplitude $E_s$ over a distance dy along y is described by:

$$\frac{dE_s}{dy} = i\kappa_s E_p E_i^* - \beta E_s \qquad \text{(Equation 1)}$$

where the material absorption coefficient is $\beta$ and $\kappa_s$ is given by:

$$\kappa_s = \frac{\omega_s d_{eff}}{2n_s c}$$

where $\omega_s$ is the angular frequency of the signal wave 3, $d_{eff}$ the nonlinear response of the nonlinear medium 4, $n_s$ the refractive index of the nonlinear medium 4 at the signal wavelength and c the speed of light.

Assuming the pump field $E_p$ and idler field $E_i$ are independent of y, that is uniform intensity, the above expression (Equation 1) can be solved to obtain the signal wave field strength as a function of y, namely:

$$E_s = i\kappa_s E_p E_i^* / \beta \{1 - \exp(-\beta y)\}$$

It is then apparent that the signal wave amplitude is dependent upon the idler wave amplitude and optimizing the idler wave gain in turn determines the optimum signal wave generation.

Applying then the coupled wave equation for the propagation of the idler wave along the x-axis and noting that in the device the pump beam 1 propagates close to the edge of the nonlinear medium 4 and so the propagation length y can be taken to be the pump beam width w measured along the y-axis, then:

$$dE_i/dx = i\kappa_i E_p / \beta \{-i\kappa_s E_p^* E_i\}\{1 - \exp(-\beta w)\}$$

The field amplitude E is related to the intensity through the usual relationship $I = EE^* nc\epsilon_0/2$. Making the appropriate substitution for $\kappa$ and $\omega = 2\pi c/\lambda$, the gain coefficient for the idler wave along x may be written in the form:

$$\alpha_i = \frac{1}{I_i}\frac{dI_i}{dx} = \frac{4\pi^2 d_{eff}^2 I_p}{n_p n_i n_s c \epsilon_0 \lambda_i \lambda_s}\left\{\frac{1 - \exp(-\beta w)}{\beta}\right\} \qquad \text{(Equation 2)}$$

Re-expressing Equation 2 in terms of pump power $P_p$ rather than intensity $I_p$ then yields the expression:

$$\alpha_i = \frac{1}{I_i}\frac{dI_i}{dx} = \frac{4\pi d_{\mathit{eff}}^2 P_p}{n_p n_i n_s c\varepsilon_0 \lambda_i \lambda_s}\left\{\frac{1-\exp(-\beta w)}{\beta wh}\right\} \quad \text{(Equation 3)}$$

where both the beam width (w) and beam height (h) appear explicitly to allow for the pump beam to take an elliptical form with area given by $\pi wh$.

For the case where parametric generation is carried out at the maximum pump intensity consistent with avoiding optical damage ($I_{max}$ say) then equation (2) applies with $I_p=I_{max}$. If there is no absorption of the generated signal wave ($\beta=0$) then equation (2) predicts that the idler gain, $\alpha_i$, increases linearly with w, as expected, since the overlap between the three interacting waves increases as w increases.

Figure 4:
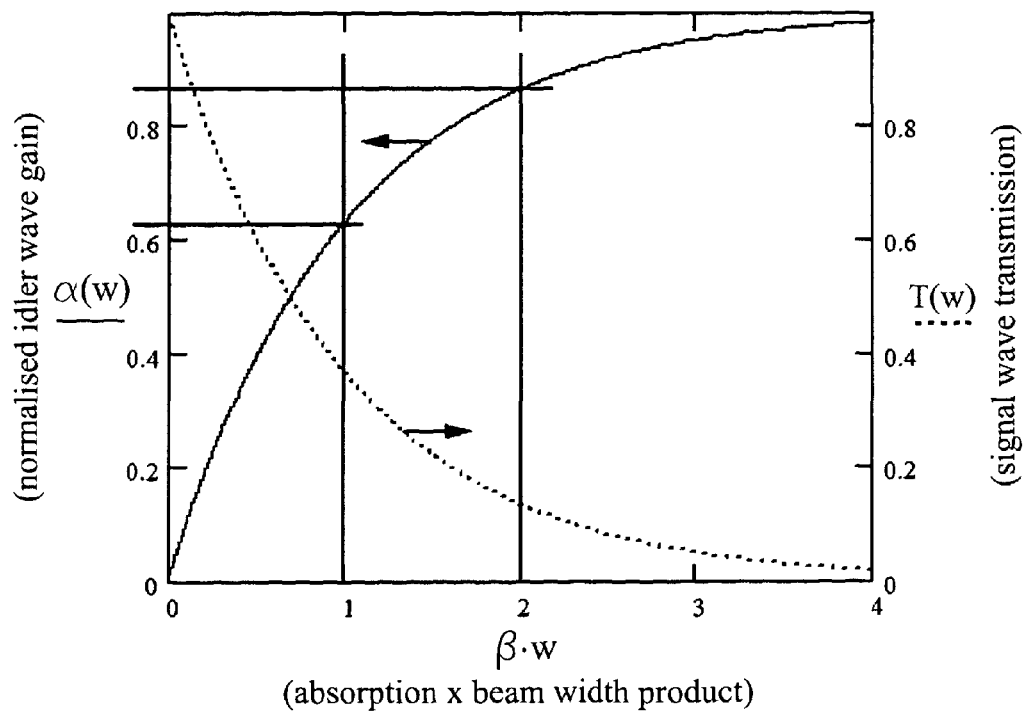
FIG. 4 is a plot of nonlinear gain against the product of the beam width and nonlinear optical material absorption and signal beam transmission against the product of the beam width and nonlinear optical material absorption for the devices of FIGS. 1, 2 and 3.

When absorption is present, and hence the absorption coefficient is finite, the term in { ... } in equation (2), and hence the idler gain coefficient, initially increases monotonically with increasing w, but asymptotically approaches a saturation (maximum) value of $(1/\beta)$. For the case where $w=\beta^{-1}$ ($w\cdot\beta=1$), the term reaches 63% of its saturation value, and by $w=2\beta^{-1}$ ($w\cdot\beta=2$) has increased to 86%, this being shown graphically in FIG. 4. Either of these figures may be regarded in practice as adequate in terms of gain optimization.

On the other hand as the pump and idler beam widths w are increased, there will be a diminishing return on usefully output coupled signal wave due to the longer path it experiences increasing its absorption before exiting the gain medium. Indeed for the case where $w=\beta^{-1}$ it may readily be estimated that only 37% of the generated signal wave exits the gain medium, this decreasing to 14% when $w=2\beta^{-1}$, this being shown graphically in FIG. 4. A compromise must therefore be reached between increasing the gain and decreasing the extraction efficiency. It is apparent that this compromise resides somewhere around the values for w under consideration above, the exact choice depending in particular on how critical gain optimization is under the circumstances appertaining to the operation of the generator. With the pump and idler beam widths thus determined by the above constraints, then for a given pump power elliptical focusing allows operation at the intensity $I_p=I_{max}$ through appropriate choice of the parameter h. However, due to possible limitations imposed on the height h of the beams, it may be necessary to employ larger values for w than those discussed above in order to avoid optical damage.

Equation (3) explores the perspective from the point of view of having a limited amount of pump power $P_p$ available. In the case of no absorption then the term in { ... } tends to $(1/h)$, when the gain is independent of w and is optimized by making h as small as possible. The gain becomes independent of w since under the conditions of applying a constant pump power $P_p$ and with h fixed, the benefit of increasing the overlap of the three interacting waves arising from increasing w is offset by the accompanying decrease in the pump intensity $I_p$ with increasing w. In the case when absorption is present and hence the absorption coefficient is finite, the term in { ... } in equation (3), and hence the idler gain coefficient, now decreases monotonically with increasing w. This is only to be expected since the decreasing intensity with increasing w which previously offset the benefits of an increasing overlap of the interacting waves is accompanied by an increasing absorption of the generated signal wave with increasing w. Optimization under the previously discussed condition of maximum intensity $I_p=I_{max}$, while tailoring h and w to accommodate the pump power available according to the rules therein stated becomes appropriate, and again is accomplished by elliptical focusing.

The above description of a specific embodiment is made by way of example only and not for the purposes of limitations. For example, the beam shaping optics may be of any suitable form, for example an anamorphic prism pair or may comprise a cylindrical pump and/or idler and/or signal beam optical cavity mirrors. It will be clear to the skilled person that modifications may be made without significant changes to the operation described. For example, the OPO may be a non-collinear phase matched OPO or the OPO may be external to the pump laser cavity.

The invention claimed is:

1. A method of controlling parametric gain in a nonlinear optical crystal that, in response to application of a pump beam, generates through a parametric generation process, signal and idler beams, wherein the signal beam is non-collinear with the pump beam, wherein the signal beam is subject to absorption due to the nonlinear material, the method involving:
    shaping the pump beam to have an elliptical cross section; and
    determining a width w of the pump beam based on at least an absorption co-efficient $\beta$ of the nonlinear optical crystal.

2. A method as claimed in claim 1 wherein the beam width is selected so that the product of the absorption co-efficient of the optical crystal and the beam width provides for maximum extraction of the generated signal beam power from the optical crystal.

3. A method as claimed in claim 1 or claim 2 wherein the width w of the pump beam is in the range $0.5/\beta$ and $2.5/\beta$.

4. A method as claimed in claim 1 or claim 2 wherein the width w of the pump beam is in the range $1/\beta$ and $2/\beta$.

5. A method as claimed in claim 1 or claim 2 wherein the width w of the pump beam is selected to be substantially $1/\beta$ or substantially $2/\beta$.

6. A system comprising a nonlinear optical crystal that generates, through a parametric generation process, signal and idler beams in response to a pump beam, wherein the signal beam is non-collinear with the pump beam, wherein the signal beam is subject to absorption due to the nonlinear material, the system comprising
    means for shaping the pump beam to have an elliptical cross section; and
    means for determining a width w of the pump beam based on at least an absorption co-efficient $\beta$ of the nonlinear optical crystal.

7. A system as claimed in claim 6, wherein the width w of the pump beam is in the range $0.5/\beta$ and $2.5/\beta$.

8. A system as claimed in claim 6, wherein the width w of the pump beam is in the range $1/\beta$ and $2/\beta$.

9. A system as claimed in claim 6, wherein the width w of the pump beam is selected to be substantially $1/\beta$ or substantially $2/\beta$.

* * * * *